United States Patent
Seo et al.

(10) Patent No.: US 10,124,693 B2
(45) Date of Patent: Nov. 13, 2018

(54) BATTERY PACK AND ELECTRIC VEHICLE INCLUDING THE SAME

(71) Applicant: SAMSUNG SDI CO., LTD., Yongin-si, Gyeonggi-do (KR)

(72) Inventors: Youngdong Seo, Yongin-si (KR); Seotaek Oh, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/190,258

(22) Filed: Jun. 23, 2016

(65) Prior Publication Data
US 2017/0001536 A1    Jan. 5, 2017

(30) Foreign Application Priority Data
Jul. 3, 2015    (KR) .......................... 10-2015-0095359

(51) Int. Cl.
*H02J 7/00* (2006.01)
*B60L 11/18* (2006.01)
*H01M 10/42* (2006.01)
*H01M 10/48* (2006.01)
*H01M 10/44* (2006.01)

(52) U.S. Cl.
CPC ....... *B60L 11/1861* (2013.01); *H01M 10/425* (2013.01); *H01M 10/44* (2013.01); *H01M 10/48* (2013.01); *H02J 7/0021* (2013.01); *H02J 7/0024* (2013.01); *H01M 2010/4271* (2013.01); *H01M 2220/20* (2013.01)

(58) Field of Classification Search
CPC .. H01M 2010/4271; H01M 2010/4278; G06F 1/1692
See application file for complete search history.

(56) References Cited

U.S. PATENT DOCUMENTS

| | | | |
|---|---|---|---|
| 6,449,554 B2* | 9/2002 | Yamawaki | B60L 15/20 477/154 |
| 6,886,648 B1* | 5/2005 | Hata | B60K 6/365 180/65.235 |
| 2002/0027037 A1* | 3/2002 | Yamamoto | B62J 99/00 180/283 |
| 2002/0111756 A1* | 8/2002 | Modgil | B60R 25/04 702/63 |

(Continued)

FOREIGN PATENT DOCUMENTS

| | | |
|---|---|---|
| KR | 2001-0076419 A | 8/2001 |
| KR | 10-0773835 B1 | 11/2007 |

(Continued)

*Primary Examiner* — Muhammad S Islam
(74) *Attorney, Agent, or Firm* — Lee & Morse, P.C.

(57) ABSTRACT

A battery pack includes a battery, a battery management system (BMS), and an inertia sensor. The battery includes at least one battery cell to supply electricity to a load. The BMS monitors voltage and current states of the battery and to control charge and discharge operations of the battery. The BMS determines a moving state of the load based on inertia information from the inertia sensor and outputs a control signal to interrupt flow of a discharge current of the battery when the discharge current is equal to or greater than a first critical current value for a preset time period and the load is determined to be stationary.

10 Claims, 4 Drawing Sheets

(56) References Cited

U.S. PATENT DOCUMENTS

| | | | |
|---|---|---|---|
| 2010/0019727 A1* | 1/2010 | Karden | B60L 11/1861 320/129 |
| 2010/0188304 A1* | 7/2010 | Clymer | H01Q 1/185 343/753 |
| 2011/0226559 A1* | 9/2011 | Chen | G01R 31/3651 187/290 |
| 2011/0248678 A1* | 10/2011 | Wade | H02J 7/0014 320/119 |
| 2014/0068314 A1* | 3/2014 | Kim | G06F 1/3212 713/340 |
| 2014/0253043 A1* | 9/2014 | Cho | G08B 21/182 320/134 |
| 2014/0266062 A1* | 9/2014 | Lee | H01M 10/44 320/134 |
| 2015/0340898 A1* | 11/2015 | Schwartz | G06F 1/266 320/103 |

FOREIGN PATENT DOCUMENTS

| | | | |
|---|---|---|---|
| KR | 10-2011-0009431 A | 1/2011 | |
| KR | 10-1313790 B1 | 10/2013 | |

\* cited by examiner

BATTERY PACK AND ELECTRIC VEHICLE INCLUDING THE SAME

CROSS-REFERENCE TO RELATED APPLICATION

Korean Patent Application No. 10-2015-0095359, filed on Jul. 3, 2015, and entitled, "Battery Pack and Electric Vehicle Including the Same," is incorporated by reference herein in its entirety.

BACKGROUND

1. Field

One or more embodiments described herein relate to a battery pack and an electric vehicle including a battery pack.

2. Description of the Related Art

Rechargeable batteries are used in a variety of portable devices and may be combined to form a battery pack. One type of battery pack includes battery cells and a peripheral circuit. The peripheral circuit may be provided on a printed circuit board for controlling charge and discharge operations of the battery cells. When a load is connected to the terminals of the battery pack, power is supplied from the battery cells to the load through the external terminals of the battery pack.

In addition to portable devices, a battery pack may be used to power various types of electric vehicles. Electric vehicles generate mechanical power from electrical energy and therefore are considered to be ecofriendly. When an electric vehicle goes up a hill, the battery pack used to power the vehicle outputs a large amount of discharge current. However, the battery pack may output a large amount of discharge current at other times that are considered inappropriate. This may occur, for example, as a result of systematic errors.

SUMMARY

In accordance with one or more embodiments, a battery pack includes a battery including at least one battery cell to supply electricity to a load; a battery management system (BMS) to monitor voltage and current states of the battery and to control charge and discharge operations of the battery; and an inertia sensor, wherein the BMS is to determine a moving state of the load based on inertia information from the inertia sensor, and is to output a control signal to interrupt flow of a discharge current of the battery when the discharge current is equal to or greater than a first critical current value for a preset time period and the load is determined to be stationary.

The battery pack may include an alarm to generate an alarm signal when the load is determined to be stationary and when the discharge current of the battery is equal to or greater than the first critical current value for the time period. The BMS may turn off the inertia sensor when the discharge current of the battery is lower than the first critical current value, and the BMS may turn on the inertia sensor when the discharge current of the discharge switch is equal to or greater than the first critical current value.

The battery pack may include a global positioning system (GPS) receiver to receive GPS signals to obtain position information, wherein the BMS is to determine a moving state of the load based on the inertia information sensed using the inertia sensor and the position information from the GPS receiver. The BMS may turn off the inertia sensor and the GPS receiver when the discharge current of the battery is lower than the first critical current value, and the BMS may turn on the inertia sensor and the GPS receiver when the discharge current of the discharge switch is equal to or greater than the first critical current value.

In accordance with one or more other embodiments, an electric vehicle may include a motor to operate based on electrical energy; and a battery pack to supply electrical energy to the motor, wherein the battery pack includes: a battery including at least one battery cell to supply electricity to a load; a battery management system (BMS) to monitor voltage and current states of the battery and to control charge and discharge operations of the battery; and an inertia sensor, wherein the BMS is to determine a moving state of the load based on inertia information from the inertia sensor, and is to output a control signal to interrupt flow of a discharge current of the battery when the discharge current is equal to or greater than a first critical current value for a preset time period and the load is determined to be stationary.

The electric vehicle may include an alarm to generate an alarm signal when the electric vehicle is determined to be stationary and the discharge current of the battery is equal to or greater than the first critical current value for the time period. The BMS may turn off the inertia sensor when the discharge current of the battery is lower than the first critical current value, and the BMS may turn the inertia sensor on when the discharge current of the discharge switch is equal to or greater than the first critical current value.

The electric vehicle may include a GPS receiver to receive GPS signals to obtain position information, wherein the BMS is to determine the driving state of the electric vehicle based on the inertia information from the inertia sensor and the position information from the GPS receiver. The BMS may turn off the inertia sensor and the GPS receiver when the discharge current of the battery is lower than the first critical current value, and the BMS may turn on the inertia sensor and the GPS receiver when the discharge current of the discharge switch is equal to or greater than the first critical current value.

In accordance with one or more other embodiments, an apparatus includes an interface; and logic to determine a moving state of a load based on inertia information from an inertia sensor and to output at least one control signal to interrupt flow of a discharge current of a battery when discharge current of the battery is equal to or greater than a first critical current value for a preset time period and the load is determined to be stationary. The logic may output a signal to an alarm when the load is determined to be stationary and when the discharge current of the battery is equal to or greater than the first critical current value for the time period.

The logic may turn off the inertia sensor when the discharge current of the battery is lower than the first critical current value, and may turn on the inertia sensor when the discharge current of the discharge switch is equal to or greater than the first critical current value. The logic may determine a moving state of the load based on the inertia information sensed using the inertia sensor and position information from a GPS receiver.

The logic may turn off the inertia sensor and the GPS receiver when the discharge current of the battery is lower than the first critical current value, and may turn on the inertia sensor and the GPS receiver when the discharge current of the discharge switch is equal to or greater than the first critical current value. The load may be an electric vehicle.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 1:
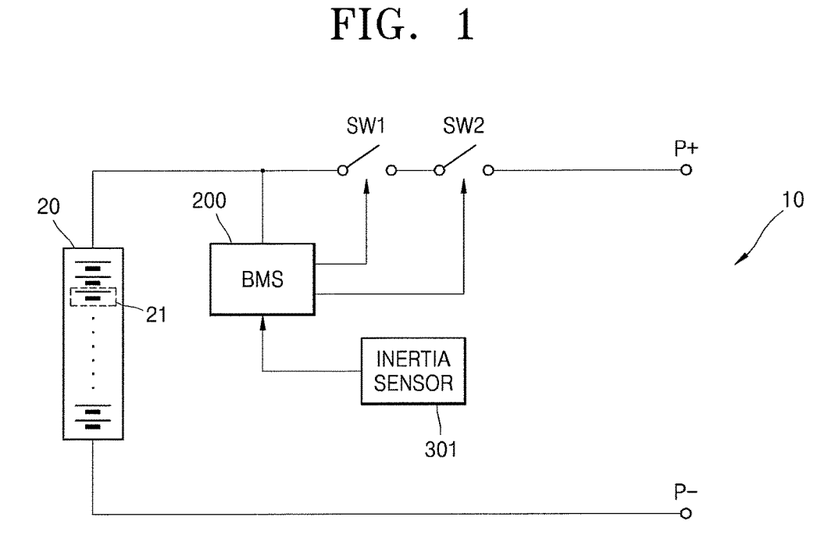
FIG. 1 illustrates an embodiment of a battery pack.

FIG. 1 illustrates an embodiment of a battery pack 10 which includes a battery 20, a charge switch SW1, a discharge switch SW2, a battery management system (BMS) 200, and an inertia sensor 301. The battery 20 stores electricity and includes at least one battery cell 21. In one embodiment, the battery 20 includes a plurality of battery cells 21 connected in series, parallel, or series-parallel. The number of cells and their connection method may be determined, for example, according to the required output voltage and/or electricity storage capacity.

The battery cells 21 may include rechargeable battery cells. For example, the battery cells 21 may include one or more nickel-cadmium battery cells, lead battery cells, nickel metal hydride (NMH) battery cells, lithium-ion battery cells, lithium polymer battery cells, or a combination thereof.

As shown in FIG. 1, the charge switch SW1 and the discharge switch SW2 are connected between the battery 20 and a terminal of the battery pack 10 (for example, between a positive electrode of the battery 20 and a terminal P+ of the battery pack 10, or between a negative electrode of the battery 20 and a terminal P− of the battery pack 10). The charge switch SW1 and the discharge switch SW2 are arranged along a high-current path through which charge current or discharge current flows.

The charge switch SW1 and discharge switch SW2 may interrupt the charge current and discharge current based on control signals. The charge switch SW1 and discharge switch SW2 may include, for example, transistors or relays. When the charge switch SW1 and discharge switch SW2 include transistor switches, each of the charge switch SW1 and discharge switch SW2 may include a parasitic diode. Discharge current may flow in the forward direction of the parasitic diode of the charge switch SW1, e.g., a direction from the positive electrode of the battery 20 to the terminal P+. When the charge switch SW1 is turned off, only current flowing in a charge direction of the battery 20 (e.g., a direction from the terminal P+ to the positive electrode of the battery 20) is interrupted.

Charge current for charging the battery 20 flows in the forward direction of the parasitic diode of the discharge switch SW2. When the discharge switch SW2 is turned off, only current flowing in the discharge direction of the battery 20 is interrupted.

The inertia sensor 301 senses the inertia of the battery pack 10 for the purpose of detecting movement of the battery pack 10. In FIG. 1, the inertia sensor 301 is separate from the BMS 200. However, the inertia sensor 301 may be in the BMS 200 in another embodiment or at a different location from the one illustrated in FIG. 1.

In one embodiment, the inertia of the battery pack 10 may be calculated based on the angular velocity of the battery pack 10. The inertia of the battery pack 10 may be determined by a different method in another embodiment. The inertia sensor 301 may include, for example, a gyro sensor or an acceleration sensor. The gyro sensor may sense the angular velocity of a device or vehicle to which the gyro sensor is attached, in order to detect movement of the device. The acceleration sensor may sense acceleration of a device or vehicle to which the acceleration sensor is attached, in order to detect the movement of the device.

The BMS 200 controls the charge switch SW1 and discharge switch SW2 to protect the battery 20. The BMS 200 controls charge current or discharge current of the battery pack 10. For example, the BMS 200 may perform functions including but not limited to overcharge protection, overdischarge protection, overcurrent protection, overvoltage protection, overheat protection, and/or cell balancing. The BMS 200 may measure states (e.g., the current, voltage, temperature, remaining electricity, lifespan, and/or state of charge) of the battery 20. The BMS 200 may measure the discharge current of the battery pack 10 using a current sensor and the voltage and temperature of the battery pack 10 using one or more other sensors.

As illustrated in FIG. 1, the battery pack 10 may be connected to a mobile load such as an electric vehicle, or for example the motor of an electric vehicle. The load may require a large amount of discharge current according to the operation of the load. If the load is an electric vehicle, the load may require a large amount of discharge current for driving uphill.

Generally, when a battery pack attached to an electric vehicle is requested to supply a large amount of discharge current to the electric vehicle, for example, for uphill driving, the battery pack may not be able to determine whether the request is made for the purpose of uphill driving or because of errors of the battery pack. If high current is continuously supplied from a battery pack to a load when the battery pack has errors, the battery pack or the load may be markedly damaged. In addition, if a battery pack supplies a large amount of discharge current to a load when the load is inoperative (e.g., stationary), the battery pack or load may be determined to have errors. In the following description, such errors will be mentioned as battery pack or system errors. The load may be an electric vehicle as previously explained, an electronic device, or another type of load.

For example, when the load to which the battery pack 10 is connected is inoperative (e.g., in a stationary state when the load is an electric vehicle) and the discharge current of the battery pack 10 is equal to or higher than a preset reference current value, the battery pack 10 may be determined to be in an abnormal state. Here, the reference current value may be referred to as a first critical current value.

In an exemplary embodiment, the BMS 200 receives information indicative of inertia measured by the inertia sensor 301. The BMS 200 determines the movement of the battery pack 10 based on the inertia information measured by the inertia sensor 301. For example, when the battery pack 10 is connected to an electric vehicle and the discharge current of the battery pack 10 is equal to or greater than the first critical current value, the BMS 200 determines whether the electric vehicle (load) is in a stationary state based on the inertia information. If it is determined that the load is in a stationary state, the battery pack 10 may be determined to have an error. In this case, the BMS 200 may turn off the discharge switch SW2 of the battery pack 10.

The BMS 200 may determine whether the discharge current of the battery pack 10 is equal to or higher than the first critical current value for a preset time period Ts. For example, even though the battery pack 10 has no error, the discharge current of the battery pack 10 may momentarily increase to a level equal to or greater than the first critical current value. Therefore, the time period Ts is set such that a momentary or temporary increase of discharge current may not be considered. For example, if the discharge current of the battery pack 10 is equal to or higher than the first critical current value for the time period Ts, the BMS 200 determines whether the battery pack 10 has an error. If the discharge current of the battery pack is equal to or higher than the first critical current for a time less than Ts, then the BMS 200 may not make a determination as to whether the battery pack 10 has an error.

In an exemplary embodiment, when the discharge current of the battery pack 10 is equal to or higher than the first critical current value for the time period Ts, the BMS 200 determines whether the load is in a stationary state based on the initial information from the inertia sensor 301. When it is determined that the load is in a stationary state, the BMS 200 determines that the battery pack 10 has an error and turns off the discharge switch SW2 of the battery pack 10.

Figure 2:
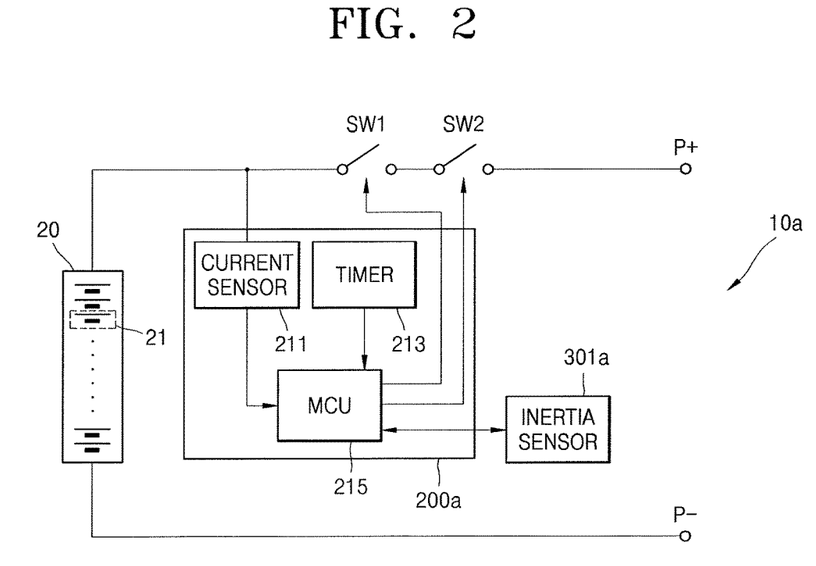
FIG. 2 illustrates another embodiment of a battery pack.

FIG. 2 illustrates another embodiment of a battery pack 10a which includes a battery 20, a charge switch SW1, a discharge switch SW2, a BMS 200a, and an inertia sensor 301a. The battery 20, the charge switch SW1, and the discharge switch SW2 may correspond to the battery 20, the charge switch SW1, and the discharge switch SW2 in FIG. 1.

The BMS 200a includes a current sensor 211 and a timer 213. The BMS 200a may transmit control signals to the inertia sensor 301a for turning on/off the inertia sensor 301a. The other structures of the BMS 200a may be substantially the same as the BMS 200 in FIG. 1.

The inertia sensor 301a may be the same as the inertia sensor 301 in FIG. 1, except that the inertia sensor 301a may be turned on or off according to control signals of the BMS 200a.

The current sensor 211 measures charge current flowing to the battery 20 and discharge current flowing outward from the battery 20. The current sensor 211 is illustrated to be in the BMS 200a. However, the current sensor 211 may be at another location outside or separate from the BMS 200a in another embodiment.

The timer 213 may be in the BMS 200a. The timer 213 may count time from the moment when a current value sensed by the current sensor 211 becomes equal to or greater than the first critical current value. The Timer 213 may inform a micro controller unit (MCU) 215 of whether the counted time exceeds the time period Ts. The MCU 215 may be in the BMS 200a or outside the BMS 200a.

The MCU 215 may analyze and calculate information transmitted to the BMS 200a. According to results of the calculation, the MCU 215 controls the charge switch SW1 and discharge switch SW2 to prevent battery cells 21 of the battery pack 10a from being overcharged or overdischarged and/or to interrupt an overcurrent flowing in the battery cells 21. For example, the MCU 215 compares the voltage of the battery cells 21 with a set voltage level and outputs one or more control signals according to results of the comparison. The one or more control signals turn on or off the charge switch SW1 and the discharge switch SW2, to thereby prevent overcharge and overdischarge of the battery cells 21 and interrupt an overcurrent flowing in the battery cells 21.

The MCU 215 receives a signal having information indicative of the inertia of the battery pack 10a from the inertia sensor 301a and determines whether the battery pack 10a is in a stationary state. For example, when the battery pack 10a is connected to a mobile load such as an electric vehicle, information indicative of the movement of the load may be obtained from the inertia sensor 301a of the battery pack 10a. The MCU 215 may receive a signal with information indicative of the discharge current of the battery pack 10a and may perform a comparison calculation on the information to determine whether the discharge current of the battery pack 10a is equal to or greater than the first critical current value for the time period Ts.

In an exemplary embodiment, because the discharge current of the battery pack 10a may vary frequently, the BMS 200a may check whether an average of discharge current output from the battery pack 10a over the time period Ts is equal to or greater than the first critical current value. For example, the BMS 200a may calculate an average of discharge current output from the battery pack 10a during the time period Ts counted by the timer 213, from the moment when the discharge current of the battery pack 10a becomes equal to or greater than the first critical current value. The BMS 200a may then compares the average of discharge current with the first critical current value. When the average of discharge current is greater than the first critical current value and the battery pack 10 is in a stationary state, the BMS 200a turns off the discharge switch SW2.

In another exemplary embodiment, when the discharge current of the battery pack 10a is equal to or greater than the first critical current value, the BMS 200a may turn on the inertia sensor 301a. When the discharge current of the battery pack 10a is lower than the first critical current value, the BMS 200a may turn off the inertia sensor 301a. For example, when the battery pack 10a is connected to an electric vehicle, when the discharge current of the battery pack 10a is equal to or greater than the first critical current value, the BMS 200a may determine whether the discharge current is output from the battery pack 10a for driving the electric vehicle or because of system errors. In this case, the BMS 200a turns on the inertia sensor 301a to check the driving state of the electric vehicle. However, when inertia information is not required, the BMS 200a turns off the inertia sensor 301a to minimize power consumption by the inertia sensor 301a.

In another exemplary embodiment, when the discharge current of the battery pack 10a is equal to or greater than the first critical current value for a predetermined time period, the BMS 200a may turn on the inertia sensor 301a. For example, if the discharge current of the battery pack 10a is equal to or greater than the first critical current value for the predetermined time period, the BMS 200a may turn on the inertia sensor 301a. If not, the BMS 200a may turn off the inertia sensor 301a.

Even though the battery pack 10a is in a normal state, the discharge current of the battery pack 10a may be temporarily increased to a level equal to or greater than the first critical current value. Therefore, a determination is made as to whether the discharge current of the battery pack 10a is equal to or greater than the first critical current value for the predetermined time period. If so, the inertia sensor 301a is turned on. As a result, the inertia sensor 301a may not be frequently turned on and off. The predetermined time period may correspond to the time period Ts or another period.

Figure 3:
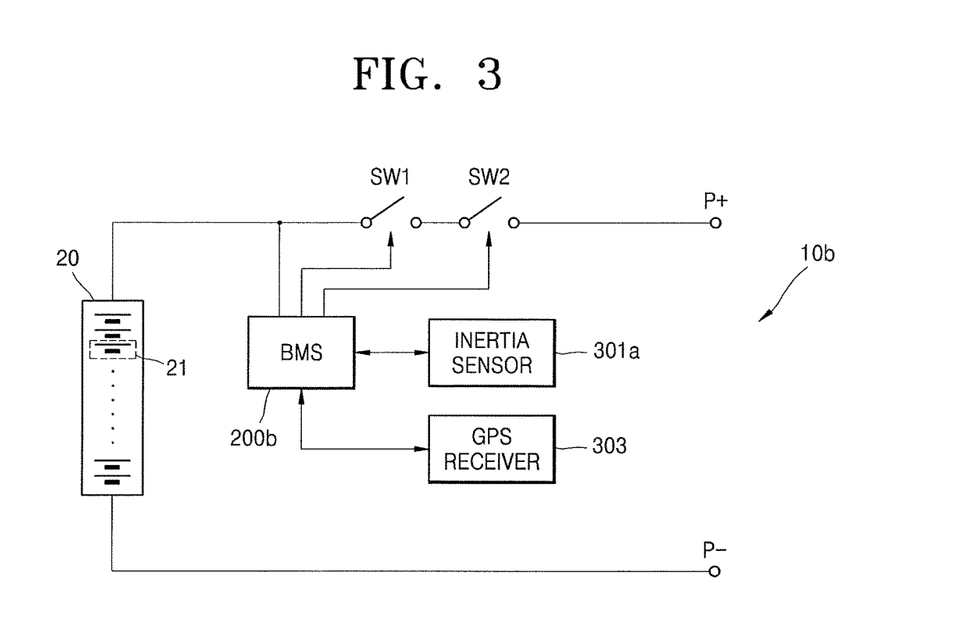
FIG. 3 illustrates another embodiment of a battery pack.

FIG. 3 illustrates another embodiment of a battery pack 10b which includes a battery 20, a charge switch SW1, a discharge switch SW2, a BMS 200b, an inertia sensor 301a, and a global positioning system (GPS) receiver 303. The battery 20, the charge switch SW1, the discharge switch SW2, and the inertia sensor 301a may correspond to the battery 20, the charge switch SW1, the discharge switch SW2, and the inertia sensor 301a in FIG. 2.

The GPS receiver 303 is in the battery pack 10b and provides information indicative of the current position of the battery pack 10b. For example, the GPS receiver 303 may receive signals transmitted from GPS satellites to determine the position of the GPS receiver 303. The GPS receiver 303 is illustrated to be separate from the BMS 200b, but may be included in the BMS 200b in another embodiment.

If the battery pack 10b is connected to a load such as an electric vehicle, the GPS receiver 303 may determine the position of the load or the battery pack 10b and provide information indicative of the position of the load or the battery pack 10b to the BMS 200b. In addition, the BMS 200b may receive information about the velocity or direction of the load or the battery pack 10b from the GPS receiver 303. The GPS receiver 303 may be turned on/off according to control signals of the BMS 200b. For example, the BMS 200b may transmit control signals to the GPS receiver 303 to turn on/off the GPS receiver 303. The other structures of the BMS 200b may be substantially the same as those of the BMS 200a in FIG. 2.

In an exemplary embodiment, the BMS 200b may determine whether the battery pack 10b is stationary or moving based on position information from the GPS receiver 303. For example, when the battery pack 10b is connected to a load such as an electric vehicle, if position information sensed by the GPS receiver 303 changes, the BMS 200b may determine that the load or the battery pack 10b is moving.

In another exemplary embodiment, when the discharge current of the battery pack 10b is equal to or greater than the first critical current value for the time period Ts, the BMS 200b may determine whether the load or the battery pack 10b is stationary or moving based on a logical sum of inertia information sensed by the inertia sensor 301a and position information sensed by the GPS receiver 303. If it is determined that the battery pack 10b and the load are stationary, there may be system errors. Thus, the BMS 200b may turn off the discharge switch SW2 of the battery pack 10b. The BMS 200b may therefore exactly determine whether the load or the battery pack 10b is stationary by additionally taking into consideration the position information sensed by the GPS receiver 303.

In another exemplary embodiment, when the discharge current of the battery pack 10b is equal to or greater than the first critical current value, the BMS 200b may turn on the GPS receiver 303. If the discharge current of the battery pack 10b is lower than the first critical current value, the BMS 200b may turn off the GPS receiver 303. For example, when the battery pack 10b is connected to a load such as an electric vehicle, if it is not required for the BMS 200b to determine whether the load is stationary, the BMS 200b may turn off the GPS receiver 303 to minimize power consumption by the GPS receiver 303.

When the discharge current of the battery pack 10b is equal to or greater than the first critical current value, the BMS 200b may determine whether the load is stationary or moving. Thus, the BMS 200b may turn on the GPS receiver 303 to sense the position of the load. In addition, if the discharge current of the battery pack 10b is equal to or greater than the first critical current value, the BMS 200b may turn on the GPS receiver 303 and the inertia sensor 301a. If the discharge current of the battery pack 10b is lower than the first critical current value, the BMS 200b may turn off the GPS receiver 303 and the inertia sensor 301a.

In another exemplary embodiment, if the discharge current of the battery pack 10b is equal to or greater than the first critical current value for the time period Ts, the BMS 200a may operate the GPS receiver 303. If not, the BMS 200b may turn off the GPS receiver 303 or may not turn on the GPS receiver 303. As previously described, when the discharge current of the battery pack 10b is momentarily (e.g., for a time<Ts) increased to a level equal to or greater than the first critical current value, it may not be required to immediately determine whether the load is stationary. This determination may be made, for example, only when the discharge currently of the battery pack 10b is at a level equal to or greater than the first critical value for the time period Ts.

Figure 4:
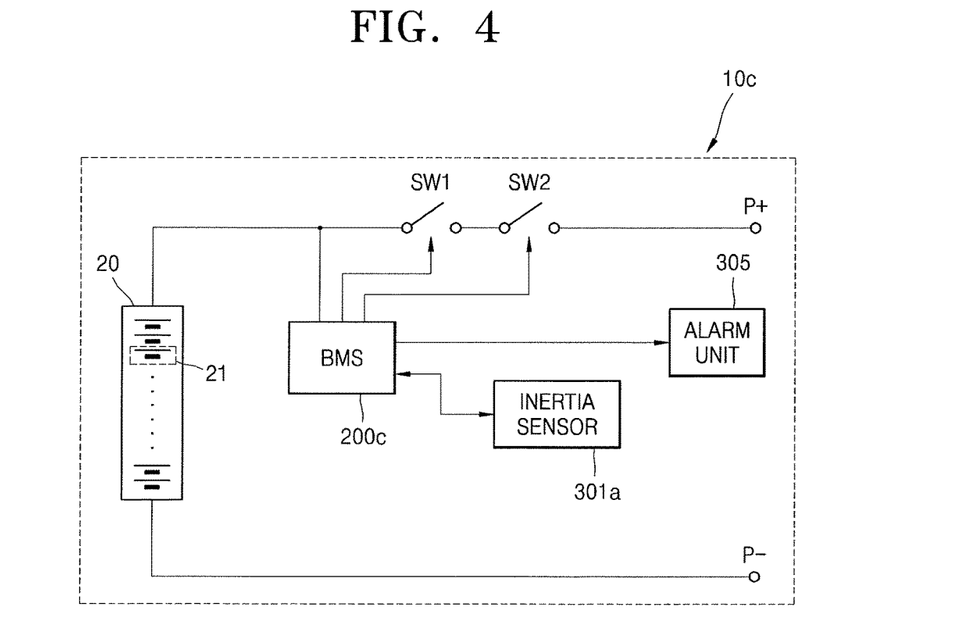
FIG. 4 illustrates another embodiment of a battery pack.

FIG. 4 illustrates another embodiment of a battery pack 10c which includes a battery 20, a charge switch SW1, a discharge switch SW2, a BMS 200c, an inertia sensor 301a, and an alarm unit 305. The battery 20, the charge switch SW1, the discharge switch SW2, and the inertia sensor 301a may correspond to the battery 20, the charge switch SW1, the discharge switch SW2, and the inertia sensor 301a in FIG. 3.

The alarm unit 305 generates alarm signals according to control signals of the BMS 200c. The alarm unit 305 may be on an outer surface of a case of the battery pack 10c, or at another location which allows a user to perceive alarm signals generated by the alarm unit 305. The alarm unit 305 may include, for example, an alarm lamp or speaker. When the BMS 200c transmits a control signal to the alarm unit 305 to turn on the alarm unit 305, the alarm unit 305 generates an alarm signal (e.g., light from the alarm lamp or a voice or other sound output from a speaker) for the user.

The BMS 200c may transmit control signals to turn on/off the alarm unit 305. The other structures of the BMS 200c may be substantially the same as those of the BMS 200a in FIG. 2.

In an exemplary embodiment, when the discharge current of the battery pack 10c is equal to or greater than the first critical current value for the time period Ts, and it is determined that the battery pack 10c and a load to which the battery pack 10c is connected are stationary based on inertia information sensed by the inertia sensor 301a, the BMS 200c generates a control signal to turn off the discharge switch SW2. In this case, a control signal for turning on the alarm unit 305 may be generated together with the control signal for turning off the discharge switch SW2. For example, when the battery pack 10c is connected to an electric vehicle, the BMS 200c may use the alarm unit 305 to inform a user that the discharge current of the battery pack 10c has been interrupted because the battery pack 10c is in an abnormal state. Thus, the user may be informed that the battery pack 10c has to be checked.

Figure 5:
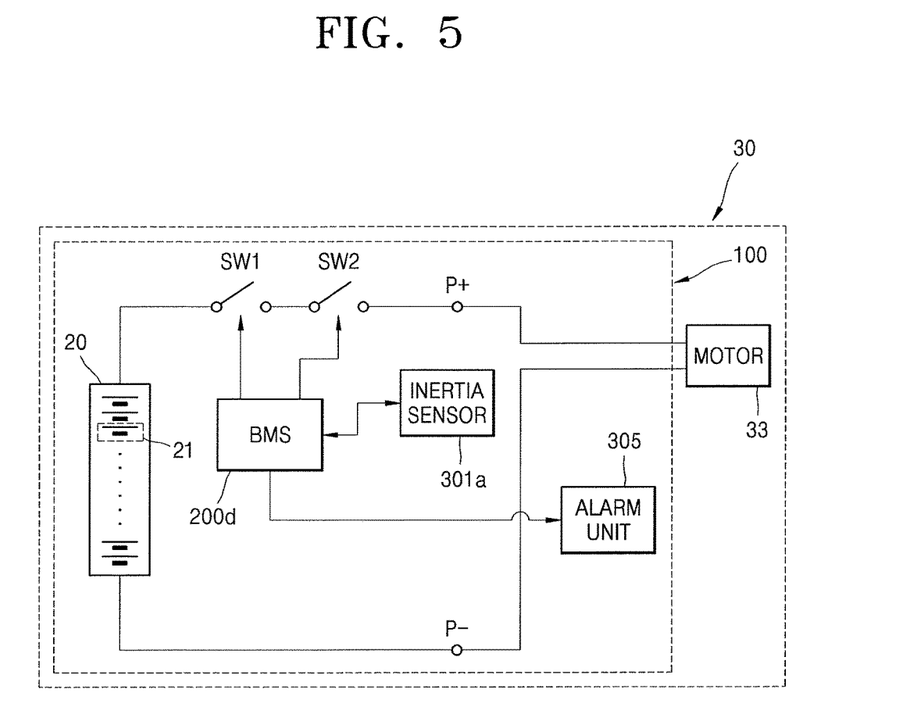
FIG. 5 illustrates an embodiment of an electric vehicle with a battery pack.

FIG. 5 illustrates an embodiment of an electric vehicle 30 including a battery pack 100. Referring to FIG. 5, the electric vehicle 30 includes a motor 33 and the battery pack 100. The battery pack 100 may be, for example, one of the battery packs described with reference to FIGS. 1 to 4.

The battery pack 100 includes a battery 20, a BMS 200d, a charge switch SW1, a discharge switch SW2, an inertia sensor 301a, and an alarm unit 305. The battery 20, the inertia sensor 301a, the charge switch SW1, and the discharge switch SW2 may correspond to the battery 20, the inertia sensor 301a, the charge switch SW1, and the discharge switch SW2 in FIG. 2. The alarm unit 305 may be on a dashboard of the electric vehicle 30 or another location where a user may perceive alarm signals output from the alarm unit 305. Wheels of the electric vehicle 30 may be driven by the motor 33, which converts electrical energy to kinetic energy.

The battery pack 100 supplies electrical energy to the motor 33 or other devices attached to the electric vehicle 30. The battery pack 100 may be at any position that allows it to supply electrical energy to devices such as the motor 33.

The motor 33 is electrically connected to the battery pack 100 to receive electrical energy from the battery pack 100. The motor 33 may be at any position that allows it to transmit power to the wheels of the electric vehicle 31. The motor 33 converts electrical energy from the battery pack 100 to kinetic energy.

The battery pack 100 is connected to the electric vehicle 30 to supply electrical energy to the electric vehicle 30. When the battery pack 100 outputs an excessively high discharge current, the electric vehicle 30 and the battery pack 100 may be damaged if the battery pack 100 does not determine whether the discharge current is caused by errors of the battery pack 100 or by operation of the electric vehicle 31 (such as an uphill driving operation). For example, damage may occur when the battery pack 100 continuously applies high current to the electric vehicle 30 even when the battery pack 100 has errors, In an exemplary embodiment, the battery pack 100 of the electric vehicle 30 includes the battery pack 10 described with reference to FIG. 1. If discharge current of the battery pack 100 applied to the electric vehicle 30 is equal to or greater than a first critical current value for a preset time period Ts, and the electric vehicle 30 is determined to be stationary based on information sensed by the inertia sensor 301a, the discharge current of the battery pack 100 applied to the electric vehicle 30 may be interrupted.

The time period Ts and the first critical current value may be the same as those described with reference to FIG. 1. In this case, the discharge current of the battery pack 100 may be determined to be equal to or greater than the first critical current value, if the discharge current of the battery pack 100 applied to the electric vehicle 30 is equal to or greater than the first critical current value for the time period Ts or the average of the discharge current output during the time period Ts is equal to or greater than the first critical current value.

In one exemplary embodiment, the battery pack 100 of the electric vehicle 30 includes the battery pack 10a in FIG. 2. If discharge current of the battery pack 100 applied to the electric vehicle 30 is equal to or greater than the first critical current value for the time period Ts and the electric vehicle 30 is determined as being stationary, the discharge current of the battery pack 100 applied to the electric vehicle 30 may be interrupted. For example, if the electric vehicle 31 is determined to be stationary based on information sensed with the inertia sensor 301a, and the discharge current of the battery pack 100 is equal to or greater than the first critical current value, it is determined that there are system errors. Thus, the discharge current of the battery pack 100 is interrupted. If discharge current flowing in the electric vehicle 30 is equal to or greater than the first critical current value, the inertia sensor 301a may be turned on.

In another exemplary embodiment, the battery pack 100 of the electric vehicle 30 includes the battery pack 10c in FIG. 4. If discharge current of the battery pack 100 applied to the electric vehicle 30 is equal to or greater than the first critical current value for the time period Ts, and the electric vehicle 30 is determined to be stationary based on information sensed with the inertia sensor 301a, the discharge current of the battery pack 100 applied to the electric vehicle 30 may be interrupted. At this time, the alarm unit 305 (e.g., on the dashboard of the electric vehicle 30 or an outer surface of the case of the battery pack 100) may be turned on to inform a user of system errors.

Figure 6:
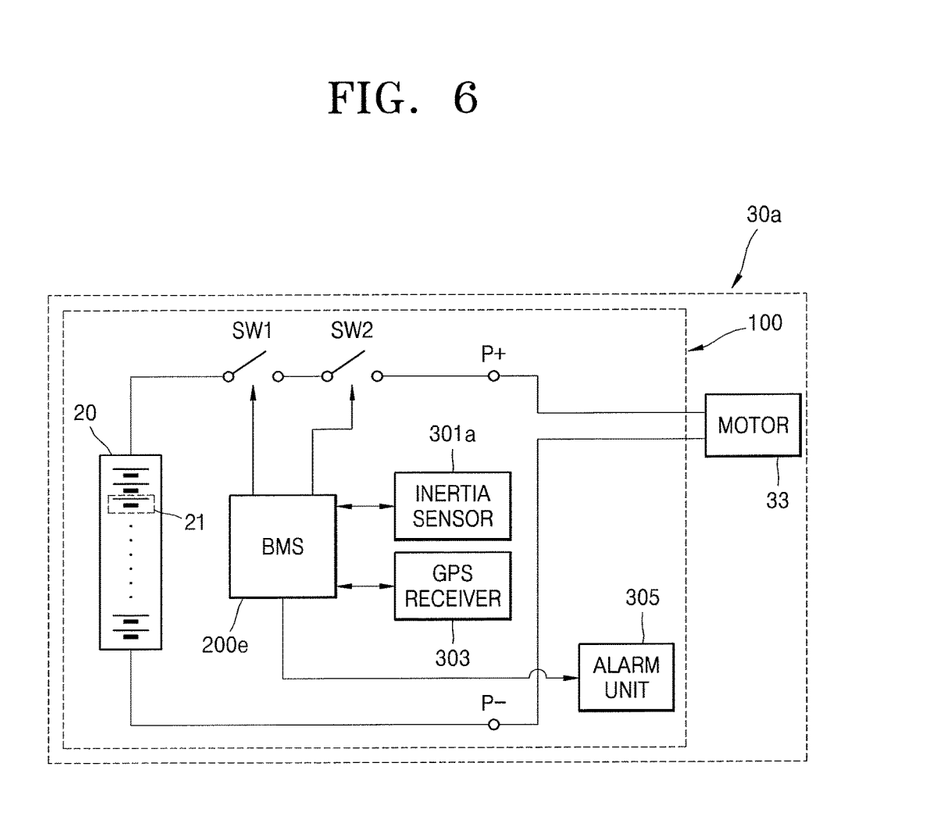
FIG. 6 illustrates another embodiment of an electric vehicle with a battery pack.

FIG. 6 illustrates another embodiment of an electric vehicle 30a which includes a motor 33 and the battery pack 100a. The battery pack 100a may be, for example, one of the battery packs 10b and 10c in FIGS. 3 and 4. The battery pack 100a includes a battery 20, a BMS 200e, an inertia sensor 301a, a GPS receiver 303, an alarm unit 305, a charge switch SW1, and a discharge switch SW2. The motor 33 and the alarm unit 305 may be substantially the same as the motor 33 and the alarm unit 305 in FIG. 5. The battery 20, the charge switch SW1, the discharge switch SW2, and the inertia sensor 301a may be substantially the same as the battery 20, the charge switch SW1, the discharge switch SW2, and the inertia sensor 301a in FIG. 2, The GPS receiver 303 may be substantially the same as the GPS receiver 303 in FIG. 3.

The GPS receiver 303 may be in the battery pack 100a and determines whether the electric vehicle 30a is stationary or moving. The battery pack 100a may determine whether the electric vehicle 30a is stationary based on a logical sum of information sensed using the inertia sensor 301a and the GPS receiver 303. For example, if discharge current of the battery pack 100a applied to the electric vehicle 30a is equal to or greater than the first critical current value for the time period Ts, and the electric vehicle 30a is determined to be stationary based on information sensed with the GPS receiver 303 and the inertia sensor 301a, the discharge current of the battery pack 100a applied to the electric vehicle 30a may be interrupted.

The discharge current of the battery pack 100a may be determined to be equal to or greater than the first critical current value if the discharge current of the battery pack 100a applied to the electric vehicle 30a is equal to or greater than the first critical current value for the time period Ts or the average of the discharge current output during the time period Ts is equal to or greater than the first critical current value.

In another exemplary embodiment, if the discharge current of the battery pack 100*a* applied to the electric vehicle 30*a* is interrupted, the alarm unit 305 (e.g., on a dashboard of the electric vehicle 30*a* or an outer surface of a case of the battery pack 100*a*) may be turned on to inform a driver that battery pack 100*a* is in an abnormal state.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The BMS and/or MCU may be implemented in logic which, for example, may include hardware, software, or both. When implemented at least partially in hardware, the BMU and/or MCU may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the BMS and/or MCU may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

In accordance with another embodiment, an apparatus includes an interface and logic to determine a moving state of a load based on inertia information from an inertia sensor and to output at least one control signal to interrupt flow of a discharge current of a battery when discharge current of the battery is equal to or greater than a first critical current value for a preset time period and the load is determined to be stationary.

The logic may output a signal to an alarm when the load is determined to be stationary and when the discharge current of the battery is equal to or greater than the first critical current value for the time period. The logic may turn off the inertia sensor when the discharge current of the battery is lower than the first critical current value, and may turn on the inertia sensor when the discharge current of the discharge switch is equal to or greater than the first critical current value.

The logic may determine a moving state of the load based on the inertia information sensed using the inertia sensor and position information from a GPS receiver. The logic may turn off the inertia sensor and the GPS receiver when the discharge current of the battery is lower than the first critical current value, and turn on the inertia sensor and the GPS receiver when the discharge current of the discharge switch is equal to or greater than the first critical current value. The load may be an electric vehicle.

The logic may be the BMS or MCU of any of the aforementioned embodiments. The interface may take various forms. For example, when the logic is embodied within an integrated circuit chip, the interface may be one or more output terminals, leads, wires, ports, signal lines, or other type of interface without or coupled to the chip.

The logic may be the BMS or MCU of any of the aforementioned embodiments. The interface may take various forms. For example, when the logic is embodied within an integrated circuit chip, the interface may be one or more output terminals, leads, wires, ports, signal lines, or other type of interface without or coupled to the chip.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A battery pack, comprising:
   a battery including at least one battery cell to supply electricity to a load;
   a battery management system (BMS) to monitor voltage and current states of the battery and to control charge and discharge operations of the battery; and
   an inertia sensor, wherein the BMS is to determine a moving state of the load based on inertia information from the inertia sensor, and is to output a control signal to interrupt flow of a discharge current of the battery when the discharge current is equal to or greater than a first critical current value for a preset time period and the load is determined to be stationary, the first critical current value indicating that the battery has an error because the discharge current of the battery has exceeded an amount of current for a stationary state of the load indicated by the inertia information, the BMS to determine that the battery has the error when the discharge current is equal to or greater than the first critical current value.

2. The battery pack as claimed in claim 1, further comprising: an alarm to generate an alarm signal when the load is determined to be stationary and when the discharge current of the battery is equal to or greater than the first critical current value for the preset time period.

3. The battery pack as claimed in claim 1, wherein:
the BMS is to turn off the inertia sensor when the discharge current of the battery is lower than the first critical current value, and
the BMS is to turn on the inertia sensor when the discharge current of a discharge switch is equal to or greater than the first critical current value.

4. The battery pack as claimed in claim 1, further comprising:
a global positioning system (GPS) receiver to receive GPS signals to obtain position information, wherein the BMS is to determine a moving state of the load based on the inertia information sensed using the inertia sensor and the position information from the GPS receiver.

5. The battery pack as claimed in claim 4, wherein:
the BMS is to turn off the inertia sensor and the GPS receiver when the discharge current of the battery is lower than the first critical current value, and
the BMS is to turn on the inertia sensor and the GPS receiver when the discharge current of a discharge switch is equal to or greater than the first critical current value.

6. An electric vehicle, comprising:
a motor to operate based on electrical energy; and
a battery pack to supply electrical energy to the motor, wherein the battery pack includes:
a battery including at least one battery cell to supply electricity to a load;
a battery management system (BMS) to monitor voltage and current states of the battery and to control charge and discharge operations of the battery; and
an inertia sensor, wherein the BMS is to determine a moving state of the load based on inertia information from the inertia sensor, and is to output a control signal to interrupt flow of a discharge current of the battery when the discharge current is equal to or greater than a first critical current value for a preset time period and the load is determined to be stationary, the first critical current value indicating that the battery has an error because the discharge current of the battery has exceeded an amount of current for a stationary state of the load indicated by the inertia information, the BMS to determine that the battery has the error when the discharge current is equal to or greater than the first critical current value.

7. The electric vehicle as claimed in claim 6, further comprising: an alarm to generate an alarm signal when the electric vehicle is determined to be stationary and the discharge current of the battery is equal to or greater than the first critical current value for the preset time period.

8. The electric vehicle as claimed in claim 6, wherein:
the BMS is to turn off the inertia sensor when the discharge current of the battery is lower than the first critical current value, and
the BMS is to turn the inertia sensor on when the discharge current of a discharge switch is equal to or greater than the first critical current value.

9. The electric vehicle as claimed in claim 6, further comprising:
a GPS receiver to receive GPS signals to obtain position information,
wherein the BMS is to determine a driving state of the electric vehicle based on the inertia information from the inertia sensor and the position information from the GPS receiver.

10. The electric vehicle as claimed in claim 9, wherein:
the BMS is to turn off the inertia sensor and the GPS receiver when the discharge current of the battery is lower than the first critical current value, and
the BMS is to turn on the inertia sensor and the GPS receiver when the discharge current of a discharge switch is equal to or greater than the first critical current value.

* * * * *